Oct. 16, 1934. T. M. EYNON 1,977,434
GAUGE
Filed Oct. 5, 1932
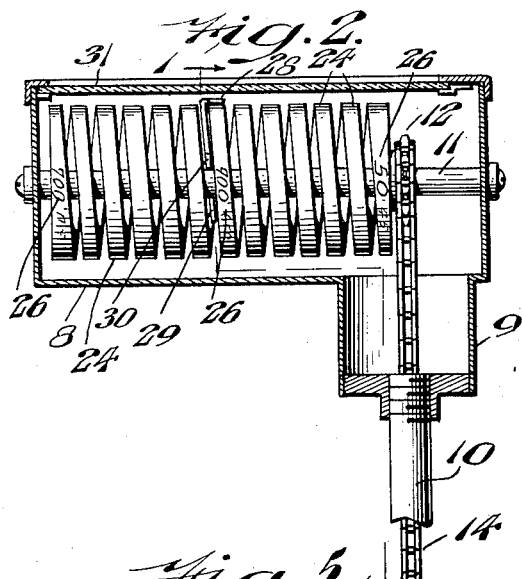
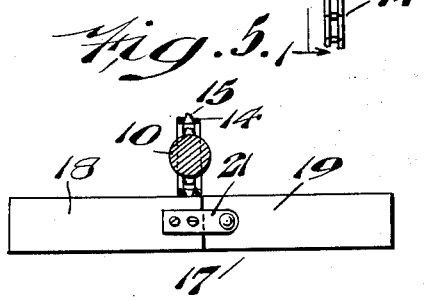
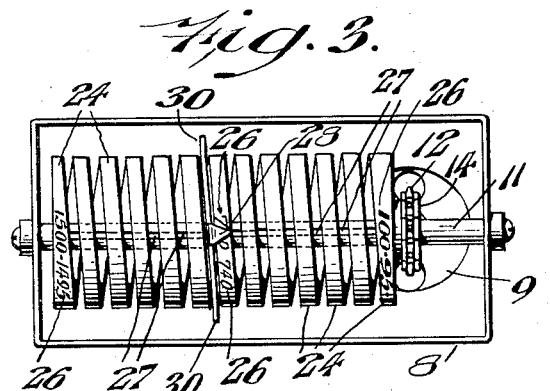
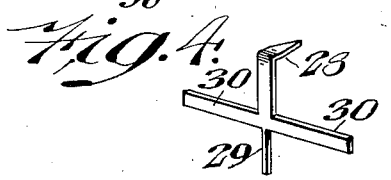
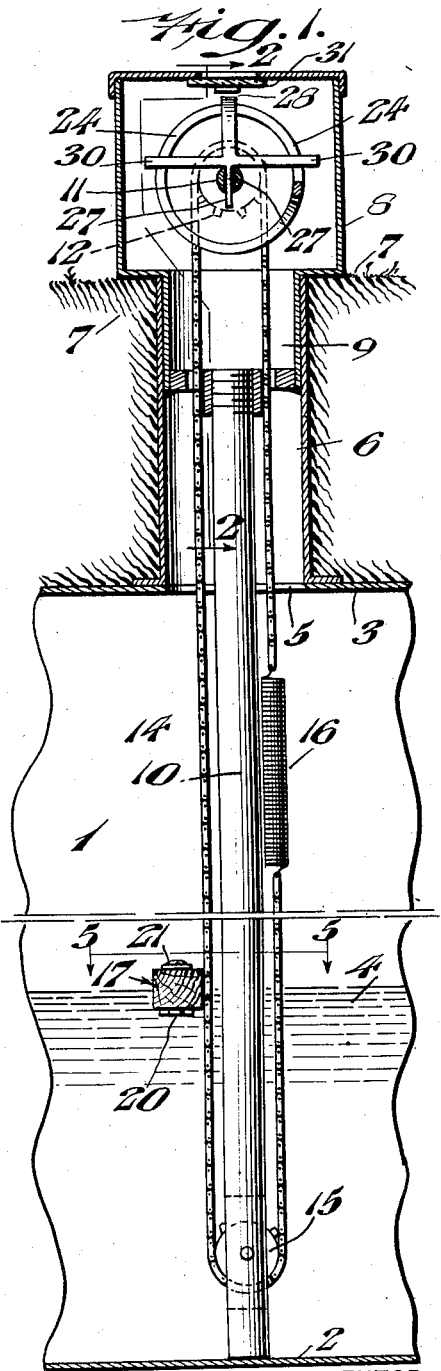
INVENTOR:
THOMAS M. EYNON,
BY
ATTORNEY Patented Oct. 16, 1934

1,977,434

UNITED STATES PATENT OFFICE 1,977,434

GAUGE

Thomas M. Eynon, Philadelphia, Pa.

Application October 5, 1932, Serial No. 636,268

1 Claim. (Cl. 116—129)

My invention relates to a new and useful gauge which is adapted to indicate the liquid contents of a tank, reservoir, or the like, in a simple and accurate manner.

My invention still further relates to a float operated gauge which is adapted to indicate the liquid contents of a tank or reservoir directly in terms of volumetric units, such as gallons and fractions thereof in lieu of general terminology, such as "empty", "half", "quarter" or "full", and in lieu of linear units heretofore used in indicating the height of the liquid in the tank which linear units had in turn to be translated into volumetric units.

My invention further relates to a gauge of this general character which is provided with a spiral scale adapted to carry the desired indicia, said spiral scale cooperating with a movable pointer whereby a greater number of figures or indicia can be utilized than can otherwise be possibly shown in linear fashion for any given linear size of gauge.

My invention still further relates to a gauge of this general character which is of extremely simple construction, which requires no attention or servicing, and which can be easily installed in or applied to any tank or reservoir, the contents of which are to be constantly measured.

My invention further relates to various other novel features of construction and advantage, all as hereinafter described and claimed in connection with the accompanying drawing, in which:

Figure 1 represents a section taken on line 1—1 of Fig. 2.

Figure 2 represents a section on line 2—2 of Figure 1.

Figure 3 represents a plan view of Figure 2.

Figure 4 represents a perspective view showing details of construction of the pointer coacting with the spiral scale shown in Figures 2 and 3.

Figure 5 is a section on line 5—5 of Figure 1 showing details of construction of the float.

Referring to the drawing in which like reference characters indicate like parts, 1 designates a tank having the bottom 2 and the top 3 and containing the liquid 4. In the top 3 of the tank is provided a relatively small opening 5 to which is fitted the neck 6 which intervenes between the top of the tank 3 and the surface 7 of the ground under which tanks of this general character are usually embedded, it being understood that if my novel gauge is applied to surface tanks the neck 6 could be dispensed with. Fitted to the neck 6 or to the opening 5 in the top 3 of the tank 1, as the case may be, there is a casing 8 having the pendant extension 9 in which is threadedly engaged the stem or rod 10, as will be best seen in Figure 2. In the casing proper 8 is the shaft 11 which carries the loose sprocket wheel 12 over which travels the endless sprocket chain 14 which also passes over the lower sprocket 15 loosely journaled in the lower end of the stem or rod 10. The sprocket chain 14 is preferably provided with the spring section 16 to take up the slack and maintain the chain in properly regulated tension. The chain 14 also carries a sectional float 17 comprising the sections 18 and 19 which are hinged together at 20, the sections 18 and 19 being held in horizontal position and being prevented from collapsing about the hinge 20 by a relatively fragile strap 21. The purpose of the strap 21 and hinge 20 is to permit the removal of the float 17 from the tank 1 after having once been inserted therein. Thus the over-all length of the float 17 is greater than the diameter of the opening 5, and therefore to be able to withdraw the rod 10 and chain 14 from the tank 1 it is necessary to collapse the float sections 18 and 19 into a position of parallel contiguity. To do this the float is formed hinged, and to maintain the sections 18 and 19 in the position shown in Figure 5 while the float is in contact with the liquid 4 the relatively fragile strap 21 is employed. For the purpose of insertion into the tank 1 the float 17 is pivotally secured to the chain 14 and for insertion through the narrow neck 6 the float is rotated into a position parallel to the rod 10 and chain 14. When it is desired to withdraw the gauge from the tank 1, the entire unit is pulled upwardly and the impact of the transversely disposed float 17 against the top 3 of the tank 1 will result in breaking the strap 21 thus collapsing the sections 18 and 19 about the hinge 20 and permitting easy withdrawal. Carried by the sprocket 12 or rigidly secured thereto is the spiral or helical scale 24, on the outer surface of which are inscribed the indicia 26 which represent volumetric units, such as gallons and fractions thereof, said indicia being predetermined by a calibration of the gauge with the particular tank in connection with which it is to be used in a manner hereinafter set forth. The shaft 11 is provided with a longitudinal groove 27 in which travels the vertical stem 29 which terminates in the pointer 28 which is adapted to coact with the indicia 26. The stem 29 is provided with the cross arm or horizontal bar 30 which extends through the spiral scale 24 (see Figure 3) and which serves to propel or actuate the stem 29 carrying the pointer 28 back and forth through the groove 27 when the spiral scale 24 is rotated by the rotation of the sprocket 12. The sprocket 12 is in turn rotated by the chain 14 which is actuated by the rise and fall of the float 17 with the rise and fall of the liquid 4 in the tank 1.

The operation is as follows: The stem 10 and casing 8, with or without the neck 6, are first applied to an empty tank 1 with the float 17 in its lowermost position adjacent the lower sprocket 15. In this position of the parts the pointer 28 occupies a position near one or the other of the ends of the helical scale 24 (depending upon the direction of rotation of the sprocket 12) and this position is marked zero. Premeasured volumetric units are then introduced into the tank at intervals and the various positions occupied by the pointer 28 with reference to the helical scale 24 are then indicated to correspond with the predetermined and known amounts introduced into the tank. Thus, if, say, five gallons are poured into the tank and they result in raising the float 17 a distance of one inch, the sprocket 12 is rotated a corresponding distance, thus rotating the helical scale 24 and moving the pointer 28 which slides in the groove a predetermined distance. The position that the pointer now occupies can then be marked as 5 gallons. Due to inevitable irregularities in the manufacture of tanks, particularly of tanks of a large size, it will be found that the spacing of the indicia along the helical scale 24 will be somewhat irregular and that if the gauge is applied to a spherical or spheroidal tank, it will be found that smaller spaces between successive indicia along the helical scale 24 will represent greater volumetric units of liquid in the tank 1 when the liquid in the tank is about the mid-height or greatest width of the tank. By thus gradually and successively introducing predetermined amounts into the tank 1, it is possible to calibrate the helical scale 24, after which the helical scale 24 can serve to indicate all future variations of the amount of liquid contained in the particular tank to which it has been calibrated. Except for the particular calibration of the helical scale 24, the balance of my device is of a standard construction which is applicable to all tanks, and where extreme exactness in accuracy is not essential, the helical scale 24, properly calibrated for a tank of any given standard size, will probably be sufficiently accurate for use in connection with other tanks of the same standard size. It is to be noted that by using the helical scale 24 to carry the indicia for designating the contents of the tank I have very greatly increased the available space and hence I am enabled to use a greater number of indicia and fractions thereof than would have been possible were the pointer 28 to cooperate with the linear scale of the length of the casing 8. The use of this helical scale 24 greatly adds to the utility and effectiveness of my novel gauge. The casing 8 may be either open at the top or may be provided with a transparent cover 31 through which the pointer 8 and indicia 26 may be viewed.

Having thus described my invention, what I claim as new and desire to secure by Letters Patent is:

In a gauge of the character stated, a fixed shaft having a slot therein, a helical scale rotatable on said shaft, and a pointer movable in said slot, said pointer being adapted to coact with and to be actuated by the rotation of said scale.

THOMAS M. EYNON.